(12) United States Patent
Mateo

(10) Patent No.: US 8,347,297 B2
(45) Date of Patent: Jan. 1, 2013

(54) SYSTEM AND METHOD OF DETERMINING AN OPTIMAL DISTRIBUTION OF SOURCE SERVERS IN TARGET SERVERS

(75) Inventor: Luis Aguilar Mateo, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 1371 days.

(21) Appl. No.: 11/387,480

(22) Filed: Mar. 23, 2006

(65) Prior Publication Data

US 2007/0226341 A1 Sep. 27, 2007

(30) Foreign Application Priority Data

May 20, 2005 (EP) .................................... 05300391

(51) Int. Cl.
*G06F 9/46* (2006.01)
*G06F 15/173* (2006.01)

(52) U.S. Cl. .................... 718/104; 718/100; 709/226

(58) Field of Classification Search .................. None
See application file for complete search history.

(56) References Cited

U.S. PATENT DOCUMENTS

| | | | |
|---|---|---|---|
| 6,223,202 B1 * | 4/2001 | Bayeh | 718/102 |
| 6,311,213 B2 * | 10/2001 | Dawson et al. | 709/217 |
| 6,513,061 B1 * | 1/2003 | Ebata et al. | 709/203 |
| 6,877,158 B1 * | 4/2005 | Arndt | 718/104 |
| 6,880,002 B2 * | 4/2005 | Hirschfeld et al. | 709/223 |
| 6,956,845 B2 * | 10/2005 | Baker et al. | 370/352 |
| 6,970,913 B1 * | 11/2005 | Albert et al. | 709/217 |
| 6,985,937 B1 * | 1/2006 | Keshav et al. | 709/223 |
| 7,203,944 B1 * | 4/2007 | van Rietschote et al. | 718/104 |
| 7,577,722 B1 * | 8/2009 | Khandekar et al. | 709/220 |
| 2003/0018927 A1 * | 1/2003 | Gadir et al. | 714/4 |
| 2003/0084157 A1 | 5/2003 | Graupner et al. | |
| 2004/0143664 A1 | 7/2004 | Usa et al. | |
| 2004/0158840 A1 * | 8/2004 | Rothman et al. | 719/321 |
| 2005/0060590 A1 * | 3/2005 | Bradley et al. | 713/320 |
| 2005/0268299 A1 * | 12/2005 | Picinich et al. | 718/100 |
| 2006/0085785 A1 * | 4/2006 | Garrett | 718/1 |
| 2006/0195715 A1 * | 8/2006 | Herington | 714/4 |

OTHER PUBLICATIONS

Morrison ("perimeter defense—in—depth: using reverse proxies and other tools to protect our internal assets", SANS institute InfoSec reading Room, Feb. 2002, pp. 1-12).*
Cardellini et al. ("Geographic load balancing for scalable distributed web systems", IEEE, 2000, pp. 20-27).*

* cited by examiner

*Primary Examiner* — Jennifer To
*Assistant Examiner* — Caroline H Arcos
(74) *Attorney, Agent, or Firm* — George R. McGuire; David B. Woycechowsky; Bond Schoeneck & King

(57) ABSTRACT

A method of, and a system for, optimizing the distribution of a plurality of source servers amongst a plurality of target servers each having a resource, wherein each of the source servers has a functional characteristic and two or more of the source servers belong to a cluster.

3 Claims, 5 Drawing Sheets

SYSTEM AND METHOD OF DETERMINING AN OPTIMAL DISTRIBUTION OF SOURCE SERVERS IN TARGET SERVERS

TECHNICAL FIELD OF THE INVENTION

The present invention relates to a system and method of determining an optimal distribution of source servers in target servers during server virtualization.

BACKGROUND ART

In view of the field of this invention, it is useful at this point to briefly review the process of server virtualization and the problem of distributing source servers in target servers.

On-demand computing is an enterprise-level computing model that allocates computing resources to an organization and its individual users on an as-needed basis. This process enables the enterprise to efficiently meet fluctuating computing demands. For example, if a group of users is working with applications that demand a lot of bandwidth, the on-demand computing model can allocate additional bandwidth specifically to this group and divert bandwidth away from users who do not need it at that time. One of the main tools used in implementing the on-demand-computing model is server virtualization as will be described below.

Although modern operating systems are inherently multi-tasking, nonetheless, there is always some interaction between the applications running under any given operating system, since the operating system must allocate resources between them. As a result, a faulty or overloaded application can significantly degrade or even disable other applications running under the same operating system. An ideal solution to this problem would be to dedicate an individual server to each application, since this would ensure minimal interaction between the applications. Furthermore, this arrangement would allow managers to run multiple operating systems on a given network, each of the operating systems being configured to provide optimal performance for different tasks such as development, deployment and control. Unfortunately, in most cases this solution is simply too expensive to be practically realizable.

One means of overcoming this problem is to virtualize a plurality of servers (known as source servers) running different operating systems on a smaller number of target servers. The virtualized servers can then be easily configured and reconfigured in accordance with user demands. Since different target servers may have different available resources and each source server may have different resource requirements, the manner in which the source servers are distributed amongst the target servers effectively determines the number of target servers required to service the needs of a network.

However, any investigation of the distribution of source servers in target servers must be based on a detailed study of the network and must consider a large number of parameters. To date, it has been necessary to perform manual computations to determine an optimal distribution of source servers within target servers. However, since the computational time of these types of optimization problems typically increases exponentially with the number of parameters considered, the large number of parameters typically considered during server virtualization makes the manual computational approach extremely tedious and time consuming. As a result, such manual computations are typically only performed for a comparatively small number of source servers (i.e. less than 25 source servers).

Similarly, if a single source server, target server or virtualization software parameter is changed; it is necessary to repeat the entire process of manual optimization for the new parameter set. Thus, it is not easy to perform experiments to investigate the effects of individual parameters on the distribution of source servers.

One way of simplifying the optimization problem is to reduce the number of parameters considered therein. For example, it is possible to focus only on the CPU and memory parameters of the source servers and target servers. However, this simplification leads to a less accurate or unreliable solution insofar as the number of target servers determined with the reduced parameter set is typically smaller than that determined with a more complete parameter set. For instance, if the only parameter considered were the CPU speed of a source server, x target servers might be sufficient to accommodate a group of source servers. However, if the memory requirements of the source servers were also to be considered, it might be necessary to use more than the x target servers to accommodate the source servers (depending on the memory resources of the target servers). In any case, it will not be possible to accommodate the source servers in anything less than x target servers.

In addition, since the result obtained with the reduced parameter set is unreliable, it is often necessary to change the distribution of the source servers at a later date when the network behaviour is better understood.

SUMMARY OF THE INVENTION

According to one aspect of the invention, there is provided a method of optimizing the distribution of a plurality of source servers amongst a plurality of target servers each having a resource, wherein each of the source servers has a functional characteristic and two or more of the source servers belong to a cluster. The method comprises the steps of (a) determining the available resources of one of the plurality of target servers, (b) determining predetermined limits associated with a relationship to the target server for each functional characteristic for one of the plurality of source servers, (c) determining a relationship between the source server and the target server based on the target server having sufficient resource to accommodate the source server and the predetermined limits being met between the source server and target server, and repeating steps (a) to (c) in order to relate each of the plurality of source servers to an appropriate one of the plurality of target servers.

According to another aspect of the invention, there is provided a system of optimizing the distribution of a plurality of source servers amongst a plurality of target servers. The system comprises (a) means for determining the available resources of one of the plurality of target servers, (b) means for determining predetermined limits associated with a relationship to the target server for each functional characteristic for one of the plurality of source servers, (c) means for determining a relationship between the source server and the target server based on the target server having sufficient resource to accommodate the source server and the predetermined limits being met between the source server and target server, and means for repeating steps (a) to (c) in order to relate each of the plurality of source servers to an appropriate one of the plurality of target servers.

According to yet another aspect of the invention, there is provided a computer program executed on a computer system comprising instructions for carrying out a method of optimizing the distribution of a plurality of source servers amongst a plurality of target servers each having a resource, wherein each of the source servers has a functional characteristic and two or more of the source servers belong to a cluster. The method comprises the steps of (a) determining the available resources of one of the plurality of target servers, (b) determining predetermined limits associated with a relationship to the target server for each functional characteristic for one of the plurality of source servers, (c) determining a relationship between the source server and the target server based on the target server having sufficient resource to accommodate the source server and the predetermined limits being met between the source server and target server, and repeating steps (a) to (c) in order to relate each of the plurality of source servers to an appropriate one of the plurality of target servers.

BRIEF DESCRIPTION OF THE DRAWINGS

Reference will now be made, by way of example, to the accompanying drawings in which.

DETAILED DESCRIPTION OF THE PREFERRED EMBODIMENT

The method of determining an optimal distribution of source servers in target servers will be known henceforth as the server optimization method. Similarly, the hardware resource requirements, utilization and functional characteristics of a server will be known henceforth as the operational parameters of the server.

Figure 1:
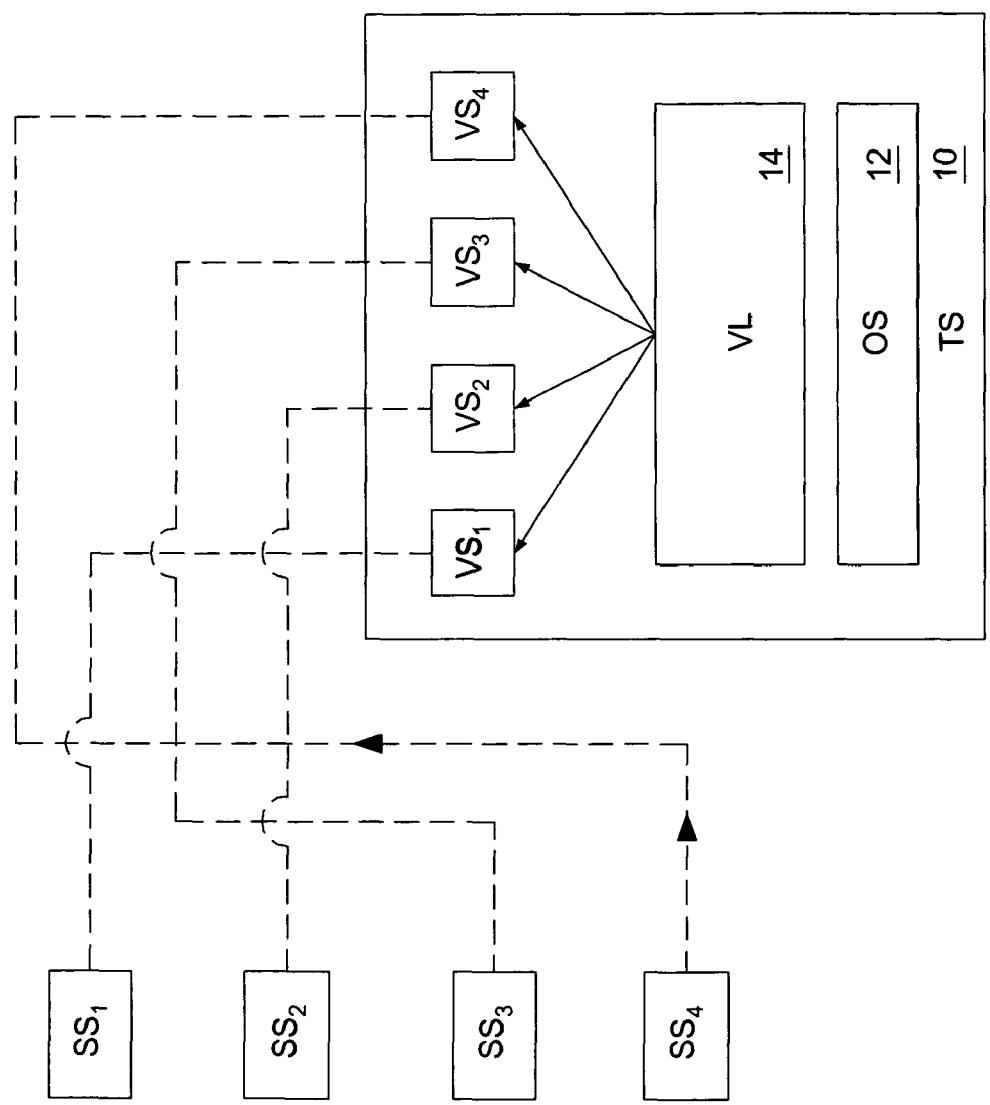
FIG. 1 is a block diagram showing an example of server virtualization wherein four source servers are virtualized in a target server.

Referring to FIG. 1, a plurality of source servers $SS_1$, $SS_2$, $SS_3$ and $SS_4$ are replaced with a target server TS that runs software that enables its processor to switch between multiple independent operating systems. These multiple independent operating systems are known as virtual servers $VS_1$, $VS_2$, $VS_3$ and $VS_4$. Each of the virtual servers can operate as an independent server with its own operating system running a set of applications. Consequently, the process of server virtualization effectively maps each source server to a virtual server that mimics in software the behaviour and capabilities of the source server. For the sake of clarity, the mapping process employed in the server virtualization process will be referred to henceforth as forming a relationship between a source server and a target server.

In more detail, the software architecture of a server virtualization system may comprise a single operating system 12 that is installed directly onto a target server 10. Above operating system 12, a virtualization layer 14 handles the redirection and emulation processes of the virtual servers. To perform these functions, virtualization layer 14 requires resources (e.g. CPU, memory and disk space). The combination of operating system 12 and virtualization layer 14 is referred to as a host. The host can spawn any number of independent virtual servers ($VS_i$), up to a pre-defined maximum limit (max_VS).

It should be noted that some virtualization layers (e.g. Vmware ESX) do not require an underlying operating system, as the virtualization layer itself is installed directly onto the target server hardware. In this case, the host is solely comprised of the virtualization layer.

In use, the operating system and applications running on each of the virtual servers ($VS_i$), do not have direct control over the resources (e.g. memory, hard drives and network ports) of target server 10. Instead, virtualization layer 14 intercepts hardware requests from the virtual server applications and handles them as appropriate.

Figure 2:
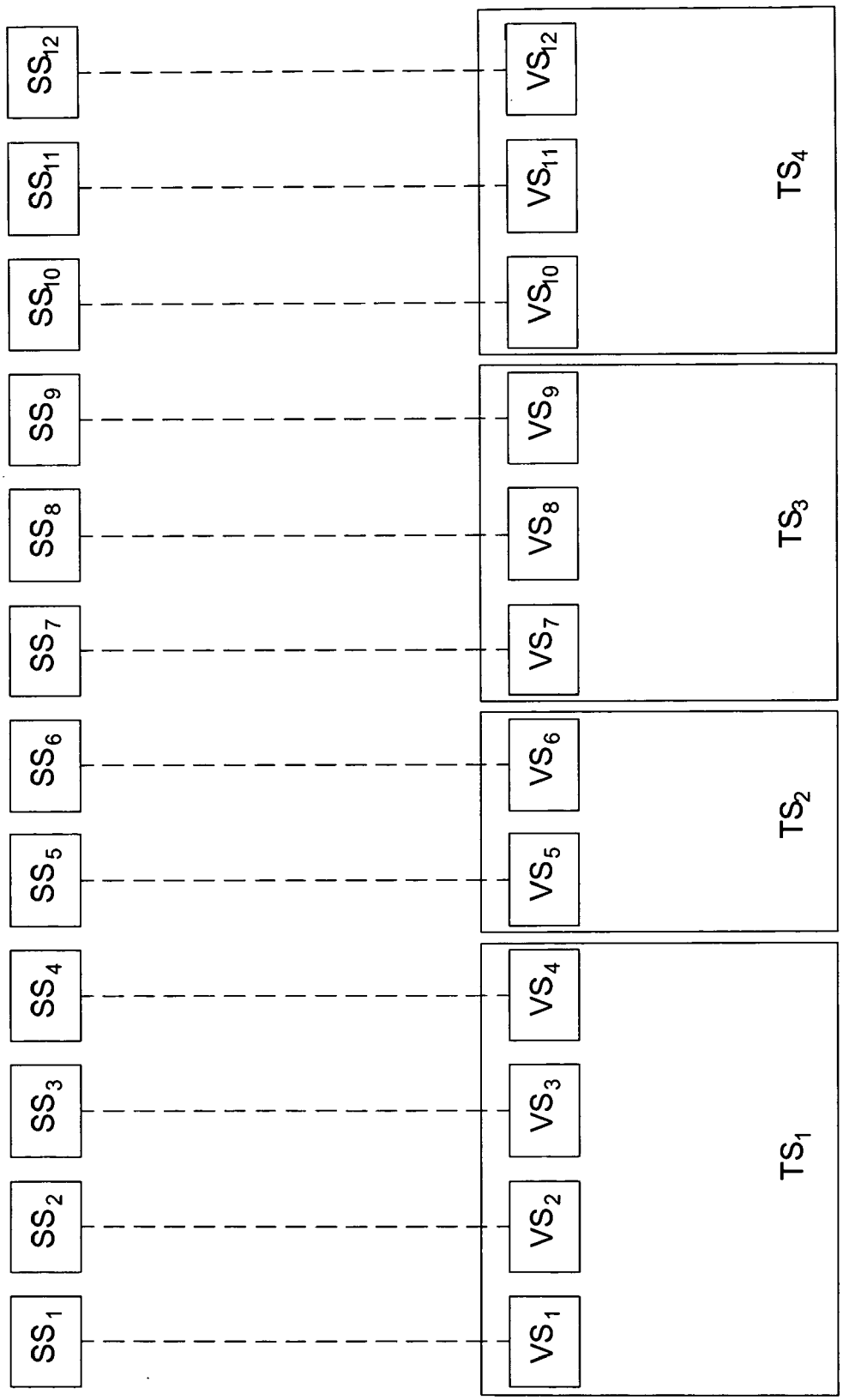
FIG. 2 is a block diagram showing an example of server virtualization wherein twelve source servers are virtualized in four target servers.

Referring to FIG. 2 and generalizing from the above principle, a network comprising a plurality of source servers $SS_1$ to $SS_{12}$ may be mapped to a plurality of virtual servers $VS_1$ to $VS_{12}$ running on a plurality of target servers $TS_1$, $TS_2$, $TS_3$ and $TS_4$. For example, source servers $SS_1$ to $SS_4$ may be mapped to virtual servers $VS_1$ to $VS_4$ running on target server $TS_1$. Similarly, source servers $SS_5$ and $SS_6$ may be mapped to virtual servers $VS_5$ and $VS_6$ running on target server $TS_2$ and source servers $SS_7$ to $SS_9$ may be mapped to virtual servers $VS_7$ to $VS_9$ running on target server $TS_3$. Finally, source servers $SS_{10}$ to $SS_{12}$ may be mapped to virtual servers $VS_{10}$ and $VS_{12}$ running on target server $TS_4$.

It will be recognized that the above scenario is used solely as an example. In particular, it will be recognized that source servers need not be virtualized in target servers in strictly numerical order. Accordingly, it is possible to minimize the number of required target servers needed to service a network by optimizing the distribution of source servers therebetween.

Figure 3:
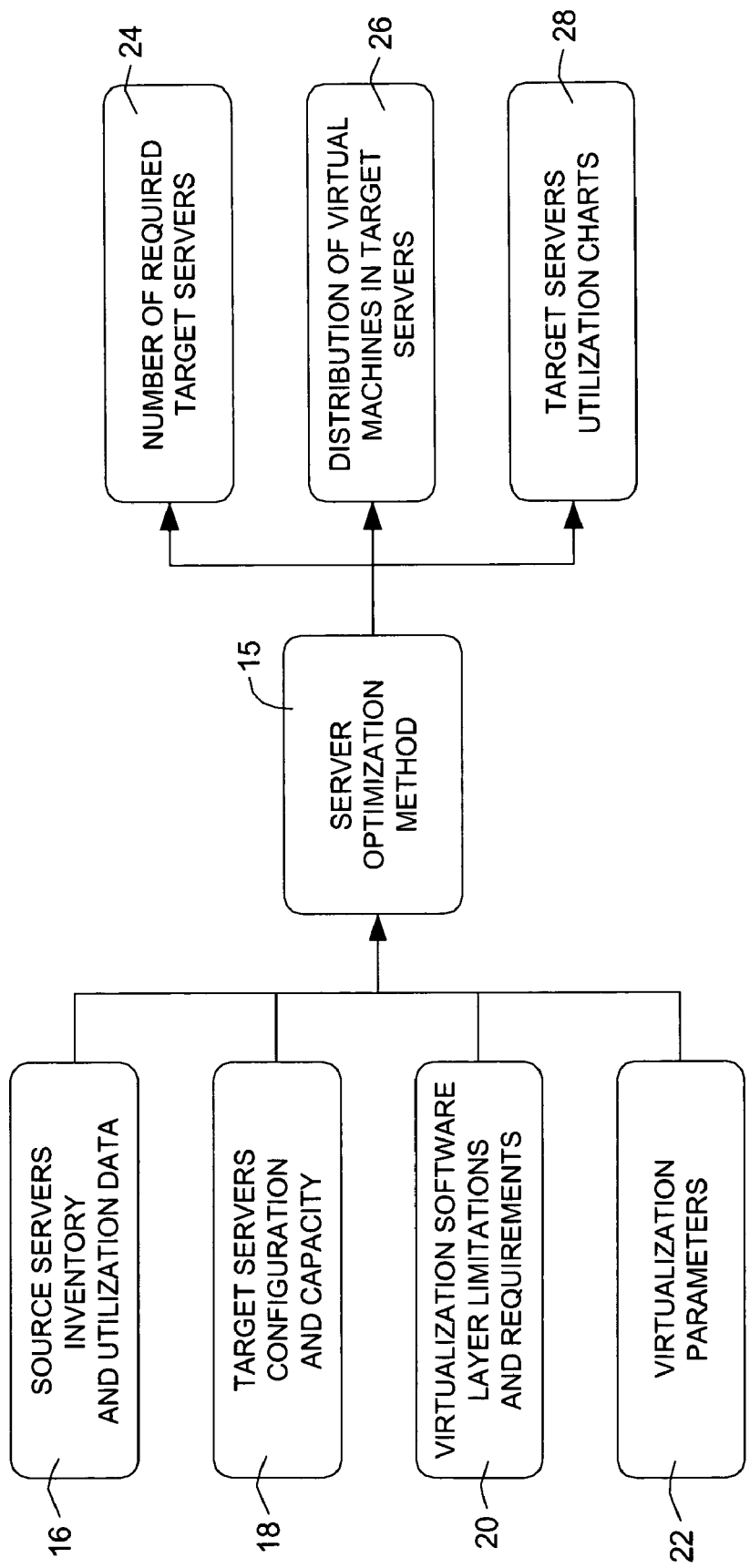
FIG. 3 is a block diagram showing the input data and output data from the method of determining an optimal distribution of source servers in target servers as provided by the first embodiment.

Referring to FIG. 3, and in view of the previous discussions, the server optimization method 15 employs the following input data:
- source server inventory and utilization 16;
- target server configuration and capacity 18
- virtualization software limitations and requirements 20; and
- virtualization parameters 22.

Source server inventory 16 considers the hardware resources (e.g. CPU speed, available memory, disk space, disk I/O etc.) and the utilization of these resources. Source server inventory 16 also considers the functional characteristics of each of the source servers. The functional characteristics considered by the server optimization method include:
- the network zones (e.g. DMZ and back-end) to which the source servers are connected;
- the availability requirements (e.g. 24×7 or 8×5 availability) of source servers;
- the clustering of source servers;
- the environment of source servers; and
- the location of source servers.

The above-described functional characteristics may be used to form constraints on the possible distributions of source servers provided by server optimization method 15. For instance, the network zones to which the source servers are connected, are included in source server optimization method 15 because, for security reasons, it may not be desirable for source servers connected to different network zones to be virtualized into the same server. Similarly, the availability requirements of individual source servers are considered, because it may be desirable to virtualize source servers with different availability requirements into different target servers to facilitate maintenance.

The clustering of source servers is included in the source server optimization method because it is desirable for servers in a high availability cluster to be virtualized into different target servers to preserve their availability. Similarly, the environment of a source server is considered because it may not be desirable for source servers belonging to different environments (e.g. Production, Development, Testing etc.) to be virtualized into the same target server. Finally, the locations of the source servers are considered because it may not be desirable for source servers in different locations to be virtualized in a target server in the same location.

For the sake of brevity, the term predetermined limits will be used to refer to a range of different limitations including clustering rules, location rules and virtualization limits.

The above input data are processed by server optimization method 15 to produce the following output data:
the number of required target servers 24
a list of the source servers virtualized on each target server 26; and
the capacity of each target server consumed by the present distribution of source servers.

Figure 4:
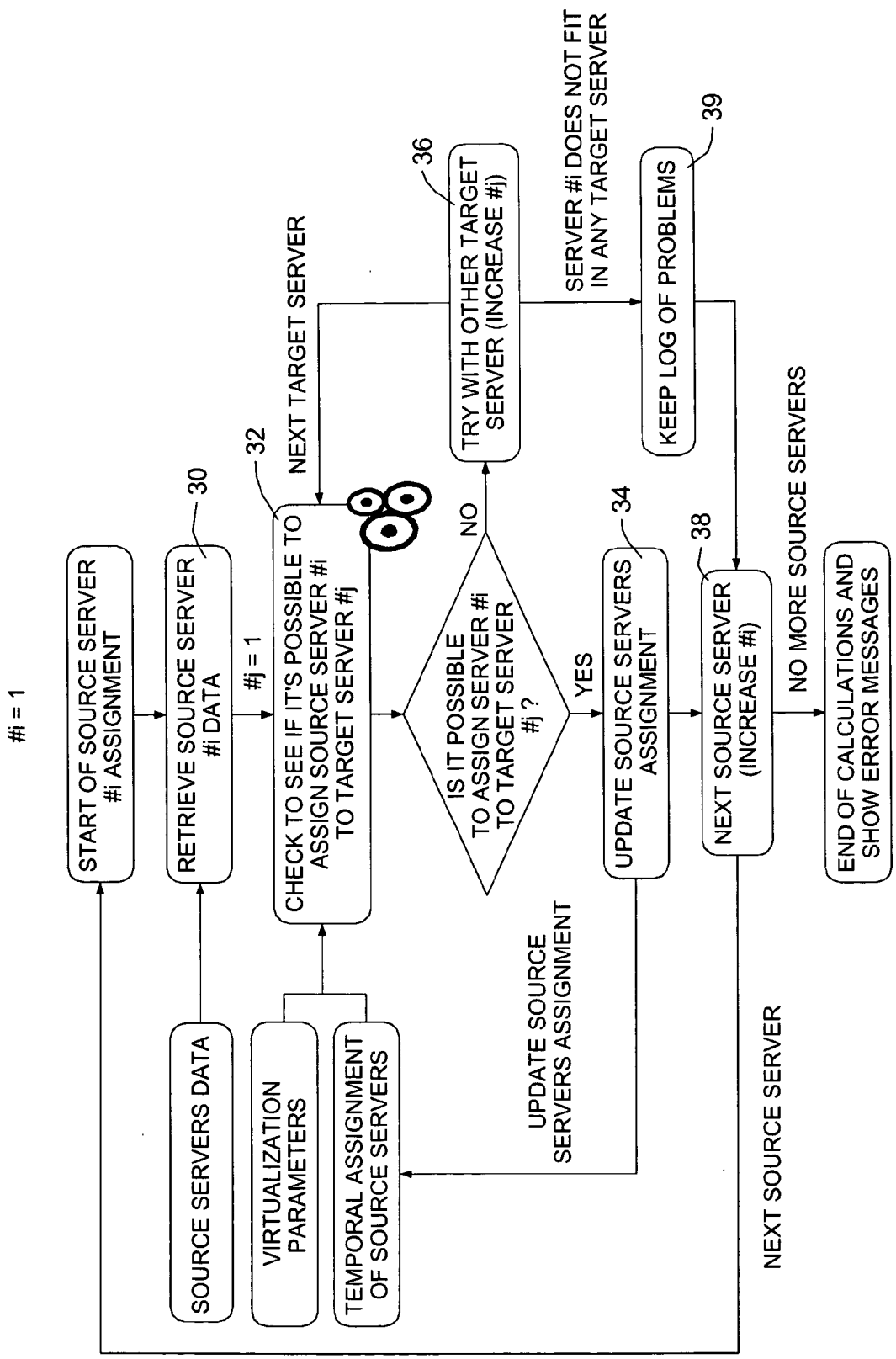
FIG. 4 is a flowchart of the method of determining an optimal distribution of source servers in target servers as provided by the first embodiment.

Referring to FIG. 4, in a first step of the server optimization method 15 the operational-parameters of a first source server are retrieved 30 from the source server. The operational parameters of the first source server are then compared against the operational parameters of a first target in step 32 server to determine whether the first source server can be virtualized in the first target server.

In particular, if the available hardware resources of the first target server are not exceeded by the resource requirements of the first source server, the virtualization layer constraints are met and the server clustering rules are not broken; the first source server is assigned to the first target server and the operational parameters of the first target server are adjusted to reflect the capacity occupied by the first source server in step 34.

However, if the resource requirements of the first source server exceed the available hardware resources of the first target server (i.e. it is not possible to virtualize the first source server in the first target server) the operational parameters of the first source server are compared against those of a second target server in step 36.

If the available hardware resources of the second target server are not exceeded by the resource requirements of the first source server, the virtualization layer constraints are met and the server clustering rules are not broken; the first source server is assigned to the second target server and the operational parameters of the second target server are adjusted to reflect the capacity occupied by the first source server. However, as before, if the resource requirements of the first source server exceed the available hardware resources of the second target server, the operational parameters of the first source server are compared with those of a third target server and the remaining target servers in step 38. If the source server cannot be accommodated on a target server, the event is reported as an error.

Once the first source server has been virtualized on a target server, the operational parameters of the next source server are retrieved and compared against the updated operational parameters of the first target server as before.

If the updated available hardware resources of the first target server are not exceeded by the resource requirements of the second source server, the virtualization layer constraints are met and the server clustering rules are not broken; the second source server is assigned to the first target server and the operational parameters of the first target server are adjusted to reflect the capacity occupied by the second source server in step 34.

However, if the resource requirements of the second source server exceed the available hardware resources of the first target server (i.e. it is not possible to virtualize the second source server in the first target server) the operational parameters of the second source server are compared against those of a second target server in step 36 and the remaining target servers in turn until it is accommodated in a target server.

The above process continues until all the source servers have been virtualized on a target server. A log is maintained in step 39, during the optimization process, of the problems encountered in attempting to allocate a source server to a given target server.

Figure 5:
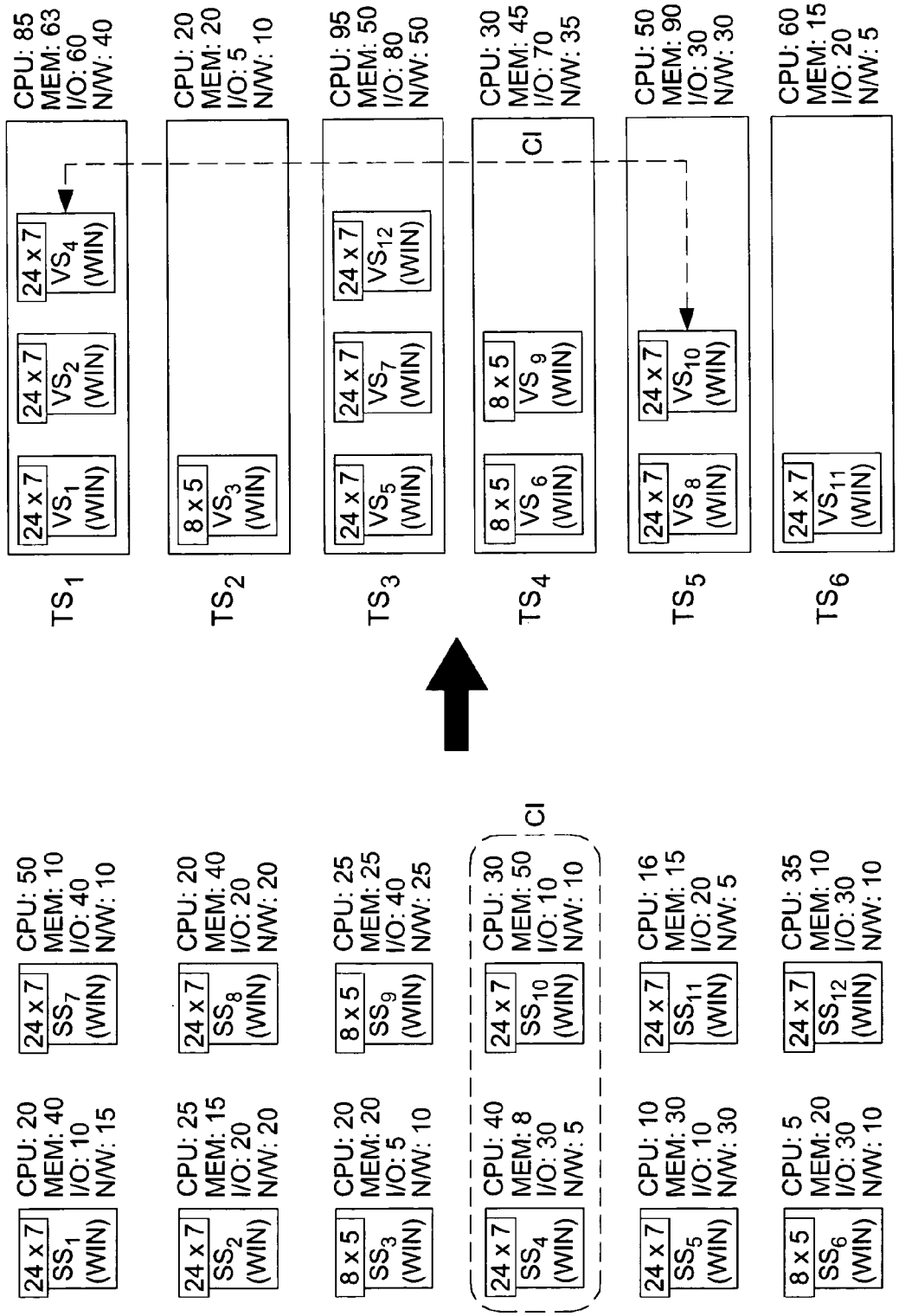
FIG. 5 is a block diagram of an example of the distribution of source servers produced by the method shown in FIG. 4.

FIG. 5 shows the results obtained from the server optimization method for an example in which twelve source servers $SS_1$ to $SS_{12}$ are virtualized in six target servers $TS_1$ to $TS_6$. The target servers each have:
a CPU speed of 100 speed units (e.g. MHz);
memory capacity of 100 data units (e.g. Mb);
Disk I/O of 100 traffic units (e.g. Mbps); and
Network traffic of 100 traffic units (e.g. Mbps).

Source servers $SS_1$, $SS_2$, $SS_4$, $SS_6$ and $SS_8$-$SS_{11}$ employ the Windows™ operating system and servers $SS_3$, $SS_5$, $SS_7$ and $SS_{12}$ employ the Linux™ operating system. Source servers $SS_1$, $SS_2$, $SS_4$, $SS_5$, $SS_7$, $SS_8$, $SS_{10}$-$SS_{12}$ all have 24×7 availability requirements, whereas the remaining source servers have reduced availability requirements, namely 8×5 availability. In addition, source servers $SS_4$ and $SS_{10}$ belong to the same cluster (Cl).

Source server $SS_1$ has a CPU speed of 20 speed units, memory capacity of 40 data units, disk I/O of 10 traffic units and network traffic of 15 traffic units. Source server $SS_2$ has a CPU speed of 25 speed units, memory capacity of 15 data units, disk I/O of 20 traffic units and network traffic of 20 traffic units. Source server $SS_3$ has a CPU speed of 20 speed units, memory capacity of 20 data units, disk I/O of 5 traffic units and network traffic of 10 traffic units.

Source server $SS_4$ has a CPU speed of 40 speed units, memory capacity of 8 data units, disk I/O of 30 traffic units and network traffic of 5 traffic units. Source server $SS_5$ has a CPU speed of 10 speed units, memory capacity of 30 data units, disk I/O of 10 traffic units and network traffic of 30 traffic units. Source server $SS_6$ has a CPU speed of 5 speed units, memory capacity of 20 data units, disk I/O of 30 traffic units and network traffic of 10 traffic units.

Source server $SS_7$ has a CPU speed of 50 speed units, memory capacity of 10 data units, disk I/O of 40 traffic units and network traffic of 10 traffic units. Source server $SS_8$ has a CPU speed of 20 speed units, memory capacity of 40 data units, disk I/O of 20 traffic units and network traffic of 20 traffic units. Source server $SS_9$ has a CPU speed of 25 speed units, memory capacity of 25 data units, disk I/O of 40 traffic units and network traffic of 25 traffic units.

Source server $SS_{10}$ has a CPU speed of 30 speed units, memory capacity of 50 data units, disk I/O of 10 traffic units and network traffic of 10 traffic units. Source server $SS_1$ has a CPU speed of 60 speed units, memory capacity of 15 data units, disk I/O of 20 traffic units and network traffic of 5 traffic units. Source server $SS_{12}$ has a CPU speed of 35 speed units, memory capacity of 10 data units, disk I/O of 30 traffic units and network traffic of 10 traffic units.

Server optimization method 15 allocates source servers with the same availability requirements to the same target server. Server optimization method 15 allocates source servers employing the same operating system to the same target server. In the present example, source servers $SS_1$, $SS_2$ and $SS_4$ (each with 24×7 availability and running the Windows™ operating system) are allocated to target server $TS_1$. Similarly, source servers $SS_5$, $SS_7$ and $SS_{12}$ (each with 24×7 availability and running the Linux™ operating system) are allocated to target server $TS_3$. Source servers $SS_6$ and $SS_9$ (each with 8×5 availability and running the Windows™ operating system) are allocated to target server $TS_4$ and source servers $SS_8$ and $SS_{10}$ (each with 24×7 availability and running the Windows™ operating system) are allocated to target server $TS_5$.

It will also be noted that in accordance with the previously mentioned clustering rules, source servers $SS_4$ and $SS_{10}$ (which are members of the same cluster Cl) are allocated to different target servers, namely $TS_1$ and $TS_5$, respectively. The remaining source servers, namely $SS_3$ and $SS_{11}$ are allocated to target servers $TS_2$ and $TS_6$, respectively.

It will be recognized that the above allocation scenario is provided for example only and in particular, should in no way be construed as limiting the implementation of the server optimization method. Furthermore, it will be understood that more sophisticated searching algorithms could also be employed in the method, for example, genetic algorithms. Finally, it will also be understood that the server optimization method could in principle, be integrated into a control algorithm, thereby providing a dynamic server allocation mechanism.

The present invention provides an automatic mechanism for determining the optimal distribution of source servers in target servers so that a minimal number of target servers is required to virtualize the source servers, taking into account the hardware requirements and functional requirements of the source servers.

In particular, the system and method of the present invention enables up to 65,000 source servers to be virtualized and distributed amongst up to 1,000 target servers. Furthermore, experiments performed on a P4 mobile computer, with a 1.5 GHz processor and 1024 GB RAM have shown that the system and method of the present invention when implemented in an Excel 2002 SP-1 spreadsheet can virtualize 500 servers in 4 seconds, and 2,000 servers in 20 seconds.

One of the most important advantages of the present invention over traditional manual calculation techniques is that the present invention can accommodate multiple parameters. This ensures that a truly optimal solution is obtained to the source server distribution problem, so that the calculated number of required target servers is reduced. Furthermore, since the solution provided by the system and method of the present invention is truly optimal, fewer corrections (or relocation of virtual machines) are required at a later date because all of the relevant network/source server/target server parameters have been taken into consideration.

Since the present invention provides an automatic optimization mechanism, it also enables experiments to be easily performed to determine an optimal consolidation platform (by changing target server characteristics (e.g. by increasing or decreasing CPU power, memory etc.)) and to investigate the effect of each parameter on the final server distribution solution.

Modifications and variations may be made to the above without departing from the scope of the invention.

What is claimed is:

1. A method of optimizing the distribution of a plurality of source servers amongst a plurality of target servers each having a resource, wherein each of the source servers has a functional characteristic and two or more of the source servers belong to a cluster; the method comprising the steps of: determining the available resources of one of the plurality of target servers; determining a set of allocation rules for allocating the plurality of source servers to the plurality of target servers based upon the functional characteristics of the source servers; and allocating the plurality of source servers to the plurality of target servers so that for each allocation of a given source server to a given target server: (i) the given target server will have sufficient computing resources to accommodate the given source server, and (ii) the set of allocation rules is met for the allocation of source servers to target servers;

wherein the set of allocation rules includes at least one of the following allocation rules which are each respectively based upon the functional characteristics of the source servers:

a network zone rule specifying that no target server shall have allocated to it both a source server that serves a DMZ network zone and a source server that serves a back-end network zone;

a temporal availability requirements rule specifying that source servers having different temporal availability requirements are respectively allocated to different target servers, with the temporal availability of a given source server being the times of the day, week or month that the given source server must be available to users;

a clustering rule specifying that source servers in a high availability cluster are respectively allocated to different target servers, with a cluster being a group of linked server computers, working together closely and thus in many respects forming a single server; and a location rule specifying that source servers serving users in different geographic locations are not respectively allocated to target servers located at the same geographic location.

2. A computer system for optimizing the distribution of a plurality of source servers amongst a plurality of target servers each having a resource, wherein each of the source servers has a functional characteristics and two or more of the source servers belong to a cluster; the system comprising:

a memory;

a first determination module for determining the available resources of one of the plurality of target servers;

a second determination module for determining a set of allocation rules for allocating the plurality of source servers to the plurality of target servers based upon the functional characteristics of the source servers; and an allocation module for allocating the plurality of source servers to the plurality of target servers so that for each allocation of a given source server to a given target server: (i) the given target server will have sufficient computing resources to accommodate the given source server, and (ii) the set of allocation rules is met for the allocation of source servers to target servers;

wherein the set of allocation rules includes an allocation rule based on consideration of at least one of the following functional characteristic of the source servers:

a network zone rule specifying that no target server shall have allocated to it both a source server that serves a DMZ network zone and a source server that serves a back-end network zone;

a temporal availability requirements rule specifying that source servers having different temporal availability requirements are respectively allocated to different target servers, with the temporal availability of a given source server being the times of the day, week or month that the given source server must be available to users;

a clustering rule specifying that source servers in a high availability cluster are respectively allocated to different target servers, with a cluster being a group of linked server computers, working together closely and thus in many respects forming a single server; and a location rule specifying that source servers serving users in different geographic locations are not respectively allocated to target servers located at the same geographic location.

3. A non-transitory computer storage medium which has stored thereon machine readable instructions for optimizing the distribution of a plurality of source servers amongst a plurality of target servers each having a resource, wherein each of the source servers has a functional characteristics and two or more of the source servers belong to a cluster; the instructions comprising:

a first determination module for determining the available resources of one of the plurality of target servers;

a second determination module for determining a set of allocation rules for allocating the plurality of source servers to the plurality of target servers based upon the functional characteristics of the source servers; and an allocation module for allocating the plurality of source servers to the plurality of target servers so that for each allocation of a given source server to a given target server: (i) the given target server will have sufficient computing resources to accommodate the given source server, and (ii) the set of allocation rules is met for the allocation of source servers to target servers;

wherein the set of allocation rules includes an allocation rule based on consideration of at least one of the following functional characteristic of the source servers:

a network zone rule specifying that no target server shall have allocated to it both a source server that serves a DMZ network zone and a source server that serves a back-end network zone;

a temporal availability requirements rule specifying that source servers having different temporal availability requirements are respectively allocated to different target servers, with the temporal availability of a given source server being the times of the day, week or month that the given source server must be available to users;

a clustering rule specifying that source servers in a high availability cluster are respectively allocated to different target servers, with a cluster being a group of linked server computers, working together closely and thus in many respects forming a single server; and a location rule specifying that source servers serving users in different geographic locations are not respectively allocated to target servers located at the same geographic location.

* * * * *